US005113310A

United States Patent [19]

Kuroki et al.

[11] Patent Number: 5,113,310

[45] Date of Patent: May 12, 1992

[54] DIELECTRIC FILTER

[75] Inventors: Hiroshi Kuroki; Yoshifumi Yamagata, both of Kagoshima; Youichi Yamashita, Shiga, all of Japan

[73] Assignee: Kyocera Corporation, Kyoto, Japan

[21] Appl. No.: 590,150

[22] Filed: Sep. 28, 1990

[30] Foreign Application Priority Data

Sep. 30, 1989 [JP] Japan ............................ 1-115078[U]
Sep. 30, 1989 [JP] Japan ............................ 1-115079[U]
Dec. 28, 1989 [JP] Japan ............................ 1-153151[U]

[51] Int. Cl.[5] ........................ H01P 1/205; H01G 1/14; H01G 4/42; H01G 7/00

[52] U.S. Cl. .................................... 361/302; 333/202; 361/321; 29/25.42

[58] Field of Search ............... 361/302, 321, 328, 329; 29/25.42; 333/302, 181

[56] References Cited

U.S. PATENT DOCUMENTS 4,144,509 3/1979 Boutros ............................... 361/302
4,179,673 12/1979 Nishikawa et al. ................. 333/204
4,839,773 6/1989 Ishikawa et al. .................... 361/321

FOREIGN PATENT DOCUMENTS 0038996 11/1981 European Pat. Off. .
0093956 11/1983 European Pat. Off. .
0208424 1/1987 European Pat. Off. .
61-292401 12/1986 Japan .
24702 2/1988 Japan .
WO83/00092 8/1983 PCT Int'l Appl. .
WO88/01104 2/1988 PCT Int'l Appl. .
WO87/01210 2/1988 PCT Int'l Appl. .
2109641 10/1982 United Kingdom .
2163606A 2/1986 United Kingdom .
2165098 4/1986 United Kingdom .
2184608 6/1987 United Kingdom .
2210225A 6/1989 United Kingdom .

*Primary Examiner*—Donald A. Griffin
*Attorney, Agent, or Firm*—Spensley Horn Jubas & Lubitz

[57] ABSTRACT

A dielectric filter comprises a first resonator and second resonator. Each of the resonators includes a dielectric block having a through-hole, an inner conductive layer placed on the inner surface of the through-hole, and an outer conductive layer placed on the outer surface of the dielectric blocks. The first and second resonators have a coupled hole extending transversely to the through-holes in portions of the resonator couples adjacent to each other. The dielectric filter may further include a frame made of a pair of metal plates covering said coupling hole. The pair of metal plates have legs for earthing and are affixed to the filter body, whereupon the metal plates are located, apart from each other. A method for producing a dielectric filter comprises the steps of making a filter body by connecting a first resonator and second resonator; providing a pair of lead frames incorporating a plurality of metal plates; disposing said filter body between said metal plates of the pair of lead frames; and fixing the metal plates to opposite sides of the filter body.

34 Claims, 5 Drawing Sheets

DIELECTRIC FILTER

BACKGROUND OF THE INVENTION

The present invention relates to a dielectric filter. More specifically, it relates to a dielectric filter having a plurality of resonators.

Personal radio telephones, mobilephones and similar devices employing microwaves include compact dielectric filters which demonstrate high selectivity. The following conventional dielectric filters relates to the present invention.

(1) A dielectric filter as disclosed in Japanese Pat. Laying-Open No. 292401/1986 is composed of a pair of resonators connected with each other. Each of the resonators comprises a dielectric block made of ceramic material having a through-hole, an inner conductive layer coating the inner surface of the through-hole, an outer conductive layer coating the outer surface of the dielectric block, and a short-circuiting layer for short-circuiting the inner and outer conductive layers. The resonators are connected by, for example, soldering the outer conductive layers. Between the facing surfaces of the adjacent resonator is a slit formed by removing a part of the outer conductive layers of the resonators.

In a dielectric filter, a passband can be obtained usually by controlling the degree of coupling between the adjacent resonators. That is, the passband is controlled by altering the size of the area of layer removed between the resonators in order to change the degree of coupling between the resonators. For example, as the layer-removed area is enlarged, increasing the degree of coupling, the passband is thereby widened.

This dielectric filter has the following drawbacks. The area of the conductive layers on the connecting surfaces of the resonators is necessarily reduced, as the layer-removed area is enlarged. This results in a reduction in the making areas available for soldering, whereby mechanical connection between the resonators is weakened. Weakened connection causes instability in the passband characteristics of the filter. When a slot is obtained by masking a part of the dielectric blocks during the process of coating the blocks with outer conductive layers, inaccurate positioning during the masking process or the coating process may alter the degree of coupling.

(2) Another dielectric filter as disclosed in Japanese Pat. Laying-Open No. 24702/1988 comprises a filter body and a frame for containing the filter body.

The filter body includes a dielectric block having a pair of through-holes, inner conductive layers coating the surface of the through-holes, an outer conductive layer coating the outer surface of the dielectric block, and a short-circuiting layer for short-circuiting the inner conductive layers to the outer conductive layer. Provided between the through-holes in a coupling hole extending in parallel to the through-holes. Thus, the filter body constitutes a filtering circuit formed by the coupling of a pair of resonators, whereby an electromagnetic coupling is generated.

The frame has a pair of metal plates disposed in parallel, and a supporting plate laterally extending between the bottom portions of the metal plates. The metal plates have legs for earthing at the bottom ends of sides.

In third dielectric filter, the filter body is contained in the frame so that the through-holes face the supporting plate.

This dielectric filter has the following drawbacks:

(a) Making the frame is difficult. Since the frame has a complex shape as described above, producing the frame is necessarily a complex process.

Furthermore, assembling the filter body to the frame is necessarily a complex process. Specifically, the filter body must be first inserted into the frame, and secondly, the filter body must be soldered to the frame; consequently the assembly is necessarily complex.

Accordingly, the above dielectric filter is necessarily expensive due to its inferior productibility.

(b) The opening of the coupling hole in the filter body is not covered by the frame, so that the dielectric filter is likely to pick up outside noise. Additionally, after the dielectric filter has been mounted on a circuit board, noise emitted from the coupling hole may deteriorate other electronic devices near the dielectric filter.

SUMMARY OF THE INVENTION

It is an object of the present invention to provide a dielectric filter which has stable bandpass characteristics.

It is another object of the present invention to provide a dielectric filter that can be easily produced at low cost.

It is yet another object of the present invention to provide a dielectric filter in which disturbance from outside noise is minimal.

It is a further object of the present invention to provide a dielectric filter in which disturbance to other electronic devices is minimal.

It is yet another object of the present invention to provide a method for easily producing a dielectric filter in mass production at low cost.

(1) According to an aspect of the present invention, a dielectric filter comprises a plurality of resonators each of which has a dielectric block including a through-hole, an inner conductive layer coating the inner surface of the through-hole, and an outer conductive layer coating the outer surface of the dielectric block. The dielectric blocks have a coupling hole which extends transversely to the through-hole through facing portions of the resonators. The coupling hole is formed by hollowing the dielectric blocks.

In this dielectric filter, the degree of coupling between the resonators can be controlled by changing the volume of the coupling hole. For example, as the coupling hole is enlarged, the degree of coupling between the resonators is increased and the passband is widened. The volume of the coupling hole can be altered by hollowing the dielectric blocks in the direction toward the through-holes. In the case large connecting areas between the resonators are maintained, in accordance with the present invention, even if the volume of the coupling hole has been enlarged, the passband characteristics of the dielectric filter according to the present invention are stable.

Furthermore, since the coupling hole of the dielectric filter according to the present invention extends transversely to the through-holes, wherein the dielectric filter is inserted into a frame, the coupling hole will be covered by the frame. Therefore, outside noise hardly disturbs the dielectric filter, since hardly any noise enters the coupling hole. Meanwhile, there is hardly any disturbance to the other electronic devices by the dielectric filter, since the frame seals the coupling hole, whereby hardly any noise generated within the coupling hole is emitted.

(2) According to another aspect of the present invention, a dielectric filter comprises a filter body and a pair of metal plates which are fixed to the outer surfaces of the filter body. The filter body has a dielectric block including a plurality of through-holes, inner conductive layers on the inner surfaces of the through-holes, and outer conductive layers coating the outer surfaces of the dielectric block. Each of the metal plates has legs for earthing.

The metal plates can be made by punching them out from a metal plate member to form a predetermined shape of plate, rather than by the complex forming steps for a conventional frame. The dielectric filter according to the present invention can be made by disposing a pair of the metal plates on the outer surfaces of the filter body, and fixing the metal plates to the filter body. Therefore, the dielectric filter according to the present invention can be easily made in mass production at low cost.

These and other objects and advantages of the present invention will be more fully apparent from the following detailed description.

DESCRIPTION OF THE PREFERRED EMBODIMENT

Embodiment 1

Figure 1:
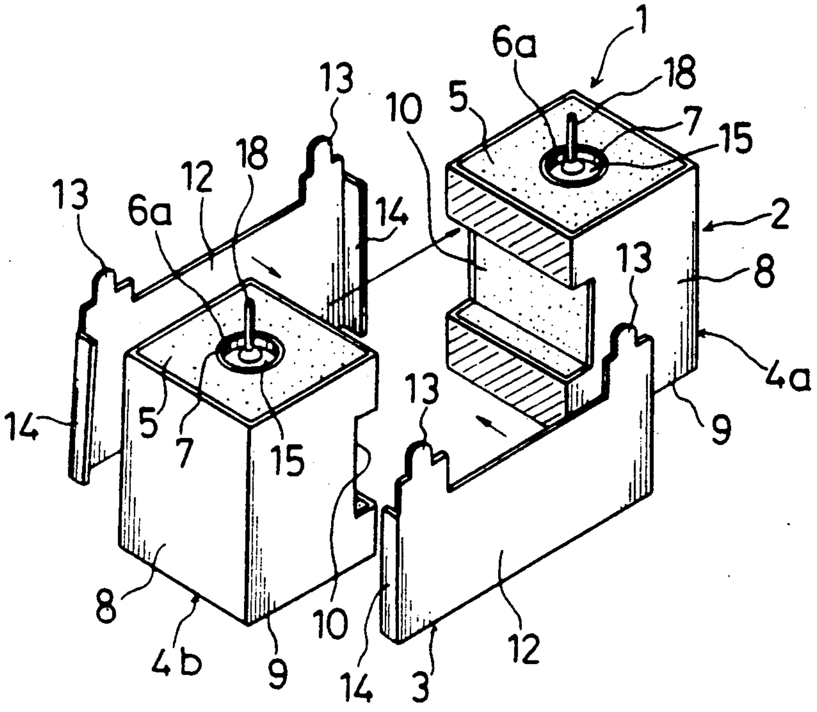
FIG. 1 is an exploded schematic view showing a dielectric filter of Embodiment 1 according to the present invention.
Figure 2:
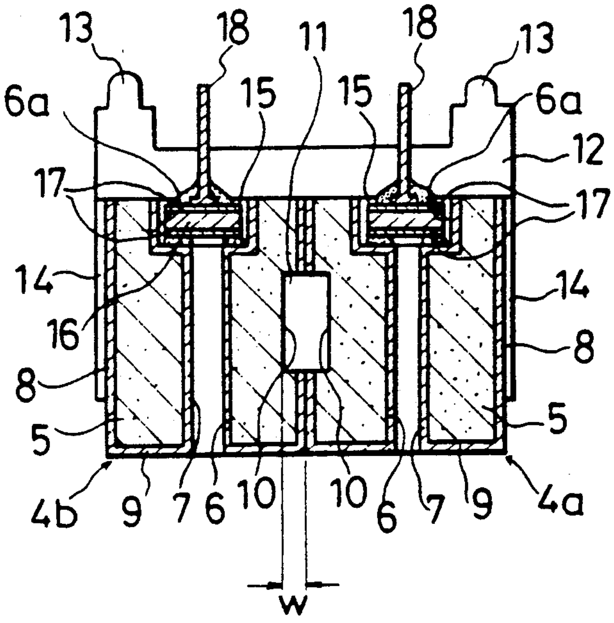
FIG. 2 is a sectional side view showing the dielectric filter of Embodiment 1.

FIGS. 1 and 2 show a dielectric filter of Embodiment 1 according to the present invention. Referring to the figures, the dielectric filter 1 primarily comprises a filter body 2 and a frame 3.

The filter body 2 has a pair of adjacent resonators 4*a* and 4*b* each of which comprises a rectangular-parallelopiped dielectric block 5. The dielectric blocks 5 are made of a ceramic material having desired dielectric characteristics, for example, of $BaO-TiO_2$, $ZrO_2-SnO_2-TiO_2$, $BaO-Sm_2O_3-TiO_2$, $BaO-Nd_2O_3-TiO_2$, or $CaO-TiO_2-SiO_2$. The height of the dielectric blocks 5 is predetermined by the corresponding required resonance frequency. Provided in each of the dielectric block 5 is a cylindrical through-hole 6, extending from its upper surface to its bottom surface in FIG. 2. An end portion, or the upper portion in FIG. 2, of the through-hole 6 has a cavity 6*a* which has a larger diameter. An inner conductive layer 7 which is made of a conductive material such as silver or copper coats the inner surface of the through-hole 6, including the cavity 6*a*. Outer conductive layer 8 coats the outer surfaces of the dielectric blocks 5, and is made of the same material as the inner conductive layers 7. A short-circuiting layer 9 made of the same material as the inner conductive layers 7 coats the bottom surface of the dielectric blocks 5 in FIG. 2. Accordingly, each dielectric block 5 has an open-circuiting surface at the top, and a short-circuiting surface for short-circuiting the inner conductive layer 7 and the outer conductive layer 8 at the bottom in FIG. 2. The inner conductive layers 7, the outer conductive layer 8 and the short-circuiting layer 9 are formed by coating and baking on the aforementioned material. In the figures, the thickness of the inner conductive layer 7, the outer conductive layer 8 and the short-circuiting layer 9 are enhanced for convenience of explanation.

Each of the resonators 4*a* and 4*b* has an angular coupling groove 10 extending transverse to the through-hole 6 along the outer surfaces which face each other. The coupling grooves 10 are open at both ends, and therefore the dielectric blocks 5 are exposed along the grooves 10. The coupling grooves 10 may be formed when the dielectric blocks 5 are made, or formed after the outer conductive layers 8 are coated onto the dielectric blocks 5.

In each of the resonators 4*a* and 4*b*, the capacitance between the inner conductive layer 7 and the outer conductive layer 8 and the inductance defined by the length of the conductive layers 7 and 8 (that is, the height of the dielectric block 5) constitute a L-C resonance circuit.

In the filter body 2, the resonators 4*a* and 4*b* are connected with each other such that the coupling grooves 10 are opposed. Accordingly, the coupling grooves 10 of the resonators 4*a* and 4*b* form a coupling hole 11, or coupling part, extending transverse to the through-holes 6.

The frame 3 is composed of a pair of metal plates 12, 12. Each plate 12 is rectangularly shaped and has a pair of legs 13, 13 for earthing, which extend upwardly from the both ends in the figure. Each plate 12 further has a pair of perpendicularly bent portions 14 which are bent on both sides.

The metal plates 12, 12 are affixed to a pair of opposite surfaces at which the coupling hole 11 opens in the filter body 2. The metal plates 12, 12 are located toward the open-circuiting surface of the filter body 2, whereupon they cover the coupling ;hole 11. The legs 13 projects beyond the open-circuiting surface of the filter body 2. The bent portions 14 of the metal plates 12 are affixed to the other pair of opposite side surfaces of the resonators 4*a* and 4*b* whereby they retain the resonators 4*a* and 4*b*.

The dielectric filter 1 has a pair of capacitors 15, 15 in the cavities 6*a*, 6*a* of the filter body 2. The capacitors 15 are composed of a ceramic disk 16 with a pair of metal layers 17 thereon. Further provided are terminal pins 18 projecting from the cavity 6*a* which are seated on metal layers 17. The opposite metal layers 17 of the capacitors 15 are joined with the inner conductive layers 7.

In the dielectric filter 1, a pair of resonators 4*a* and 4*b* constitute a filter circuit with electromagnetic coupling at the coupling hole 11. The capacitors 15 in the cavities *6a* are input/output capacitors of the filter circuit. The legs 13 of the metal plates 12 are for earthing terminals.

The passband of the dielectric filter 1 can be controlled by the degree of coupling between the resonators *4a* and *4b*. The degree of coupling between the resonators *4a* and *4b* is controlled by changing the volume of the coupling hole 11. If the volume of the coupling hole 11 is enlarged, the degree of coupling is increased, widening the passband of the filter 1. On the other hand, if the volume of the coupling hole 11 is reduced, the degree of coupling is reduced, narrowing the passband of the filter 1. When the volume of the coupling hole 11 is made large in order to widen the passband, the depth of the coupling grooves 10, or "w" in FIG. 2, of the resonators *4a* and *4b* is made greater. On the other hand, in order to narrow the passband, the depth w must be reduced. Since the volume of the coupling hole 11 is controlled only by changing the depth w of the coupling grooves 10, and not the height, in this embodiment, correct facing of the pair of coupling grooves 10, 10 is facilitated. Therefore, a prescribed passband for the dielectric filter 1 is readily obtained. Furthermore, the passband is controlled only by changing the depth w of the coupling grooves 10 in this embodiment, whereby the connecting area of the resonators *4a* and *4b* (the hatched area in FIG. 1) is kept large, in spite of passband alteration. That is, the connection strength between the resonators *4a* and *4b* may be maintained, regardless of changes in the passband width, in case that the resonators *4a* and *4b* are connected by soldering.

The dielectric filter 1 may be mounted on a prepared circuit board. Thereon, the terminal pins 18 of the capacitors 15 are connected to signal lines, and the legs 13 of the metal plates 12 are connected to earth lines. For example, if the terminal pin 18 of the resonator *4b* is used for the input terminal, and the terminal pin 18 of the resonator *4a* is used for the output terminal, high frequency signals may be inputted into the inner conductive layer 7 of the resonator *4a* through the capacitor 15. The L-C resonance circuit including the inner conductive layer 7 and the outer conductive layer 8 of the resonator *4a* resonates with a predetermined passband from the inputted high-frequency signals, whereby a prescribed band of the high-frequency signals is outputted through the electromagnetic coupling at the coupling hole 11 to the resonator *4b*. In the same manner, the resonator *4b* also resonates with a predetermined passband from the signals from the resonator *4a*, whereby signals of a prescribed passband are outputted from the terminal pin 18 of the resonator *4b*. Thus, the inputted high-frequency signals are filtered through the dielectric filter 1.

The dielectric filter 1 mounted on a circuit board has its coupling hole 11 covered by the metal plates 12, 12. Consequently, hardly any ambient noise enters the coupling hole 11, whereby the fine filtering characteristics of the dielectric filter are maintained. Furthermore, hardly any noise generated in the coupling hole 11 is emitted, since the metal plates 12, 12 cover the hole 11, so that the dielectric filter 1 hardly has any deteriorative effect upon the other electronic devices mounted on the circuit board.

Figure 3:
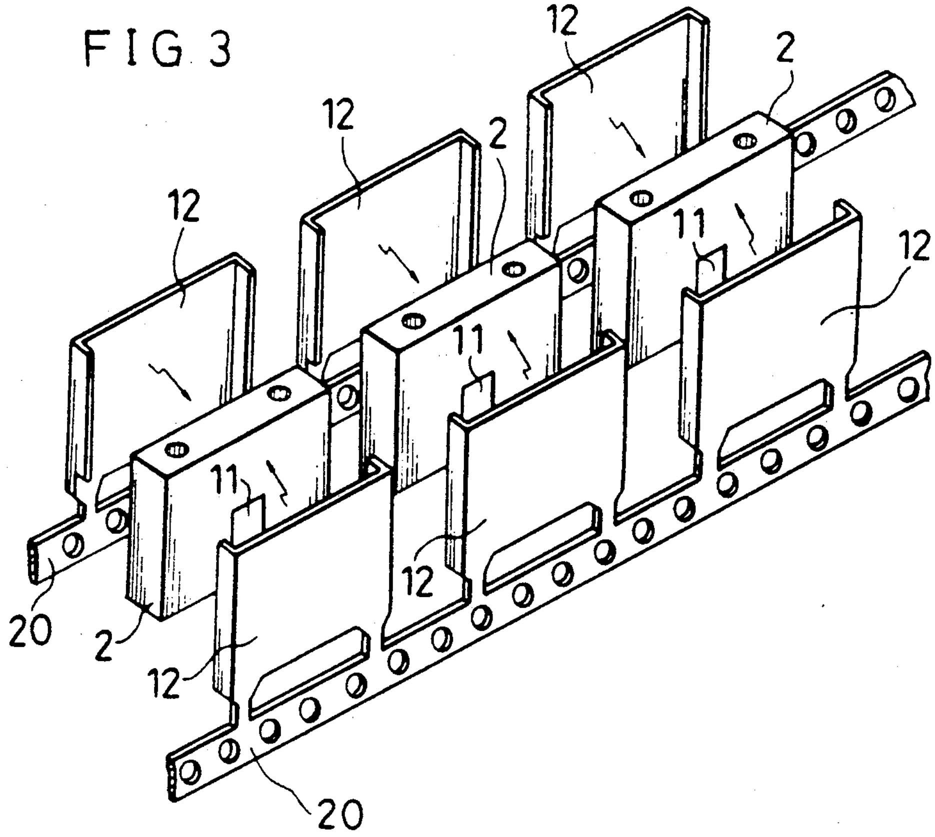
FIG. 3 is an isometric schematic view showing a production step for the dielectric filter of Embodiment 1.

In the production of the dielectric filter 1, the frame 3 is first formed quite readily. The metal plates 12 which constitute the frame 3 are made by blanking out a metal plate material whereby, as shown in FIG. 3, one lot of aligned metal plates 12 formed integrally with a lead frame 20 is obtained. Therefore, the frame 3 can be made at low cost in mass production. Next, a pair of the lead frames 20 having one lot of metal plates 12 are disposed in parallel as shown in FIG. 3, and a plurality of the filter bodies 2 are located between the pair of lead frames 20. Then, the metal plates 12 are soldered to the filter bodies 2, whereby the dielectric filters 1 are obtained. If a small quantity of solder cream or a piece of solder ribbon is provided on the metal plates 12, the dielectric filters 1 may be manufactured by pressing the metal plates 12 onto the filter bodies 2 with heat blocks. Accordingly, the dielectric filter 1 can be mass-produced through a few simple steps, wherein the manufacturing cost of the dielectric filters 1 is lowered.

In the above production, the filter bodies 2 may have the resonators *4a* and *4b* connected by soldering, whereby the passband characteristics of the filter 1 are stabler.

Embodiment 2

FIGS. 4A, 4B, 4C and 4D show other resonators each of which may constitute the dielectric filter 1.

Figure 4A:
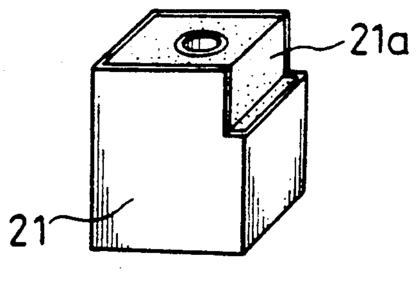
FIGS. 4A, 4B, 4C and 4D are isometric views showing, respectively, the different resonators of Embodiment 2.

A resonator 21 in FIG. 4A has an notch *21a* near the open-circuiting surface, in the surface for connection with the opposite resonator (not shown). The pair of the resonators 21 may constitute a filter body having a coupling portion which opens at the open-circuiting surface.

Figure 4B:
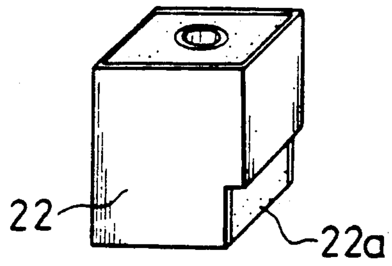

A resonator 22 in FIG. 4B has a notch *22a* near the short-circuiting surface, in the surface being connection with the opposite resonator (not shown). The pair of resonators 22 may constitute a filter body having a coupling portion which opens at the short-circuiting surface.

Figure 4C:
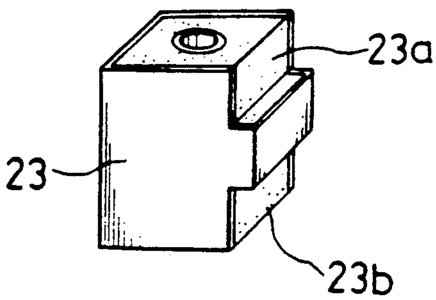

A resonator 23 in FIG. 4C has a pair of notches *23a* and *23b* near both the open-circuiting surface and the short-circuiting surface, in the surface for connection with the opposite resonator (not shown). The pair of resonators 23 may constitute a filter body having a pair of coupling portions which open at both the open-circuiting surface and the short-circuiting surface.

Figure 4D:
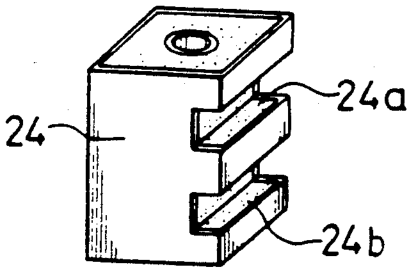

A resonator 24 in FIG. 4D has a pair of coupling grooves *24a* and *24b* in the surface for connection with the opposite resonator (not shown). The pair of resonators 24 may constitute a filter body having a pair of coupling holes, or coupling portions.

In the above resonators 21, 22, 23 and 24, the area of the coupling portion(s) is made less than a half of the overall area of the connecting surface, so that the sufficient connecting strength between the resonators is maintained.

Embodiment 3

Figure 5:
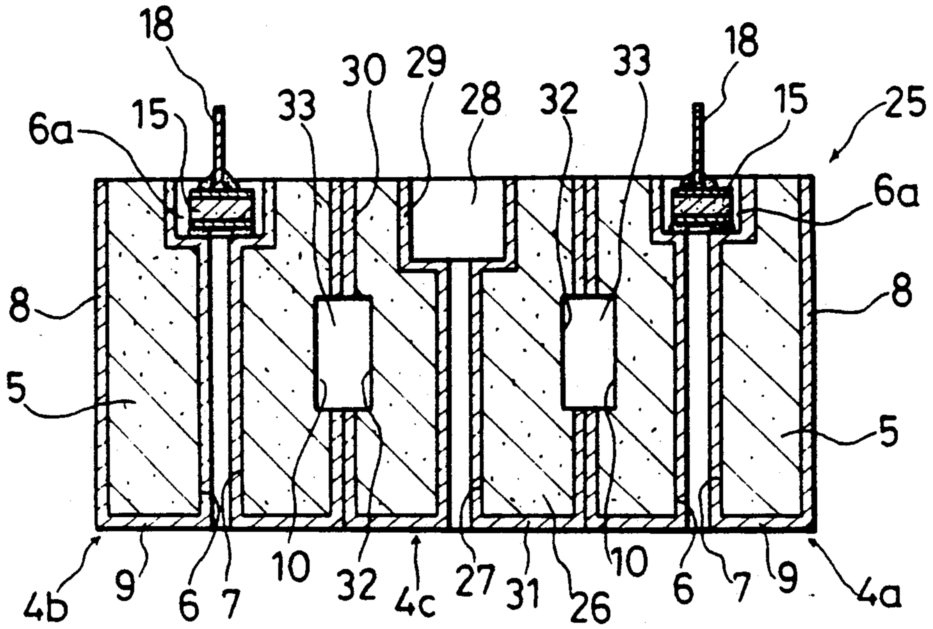
FIG. 5 is a sectional side view showing a dielectric filter of Embodiment 3.

FIG. 5 shows a dielectric filter 25 having three connected resonators. Modified from the dielectric filter 1 of Embodiment 1, the dielectric filter 25 further includes a resonator *4c* between the resonators *4a* and *4b* of Embodiment 1.

The resonator *4c* has a dielectric block 26 in the same manner as the resonators *4a* and *4b*. The dielectric block 26 has a cylindrical through-hole 27 extending vertically. The through-hole 27 has an enlarged cavity 28, in the top end in FIG. 5. An inner conductive layer 29 coats the inner surface of the through-hole 27 including the cavity 28. An outer conductive layer 30 coats the outer surface of the dielectric block 26. The inner conductive layer 29 and the outer conductive layer 30 are short-circuited by a short-circuiting layer 31 located on the bottom surface of the dielectric block 26. The resonator 4c has coupling grooves 32 extending perpendicular to the through-hole 27 in the surfaces facing the resonators 4a and 4b. The coupling grooves 32 are positioned so that they correspond to the coupling grooves 10 of the resonators 4a and 4b. The dielectric block 26 is exposed along the coupling grooves 32.

In the dielectric filter 25 according to this embodiment, a coupling hole 33, or a coupling portion, extends transversely to the through-holes 6 and 27 of the resonators 4a, 4b and 4c through the connecting portions of the resonators 4a, 4b and 4c. The three resonators 4a, 4b and 4c of the dielectric filter 25 constitute a filter circuit with electromagnetic coupling at the coupling holes 33, 33.

In the dielectric filter 25 having the three resonators 4a, 4b and 4c, the resonance frequency of the resonator 4c located in the center must be lower than that of the other resonators 4a and 4b. In general, it is known that the resonance frequency of a resonator is lowered by using a longer resonator. However, in positioning the coupling grooves 10 and 32 it is hard to make the grooves correctly correspond to each other, so that assembling the dielectric filter 25 becomes difficult, since the resonator 4c is longer than the other resonators 4a and 4b, according to conventional method. In the present embodiment, however, the depth of the cavity 28 is greater than that of the cavity 6a of the other resonators 4a and 4b, whereby the resonance frequency of the central resonator 4c is lowered.

Figure 6:
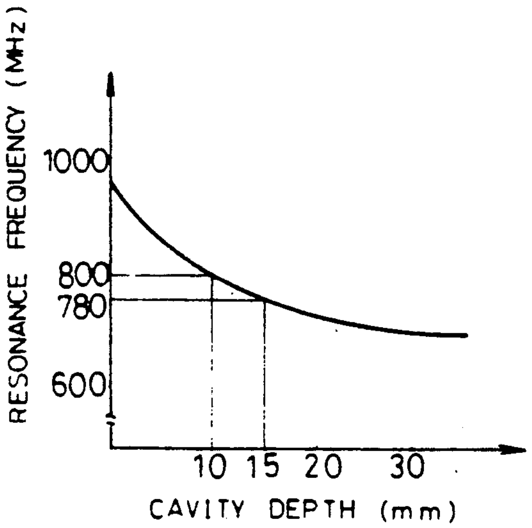
FIG. 6 is a graph showing the relation between the cavity depth and the resonance frequency of Embodiment 3.

FIG. 6 shows the relationship between the depth of cavities and resonance frequencies in a 800 MHz filter, wherein the height of resonators 4a, 4b and 4c is 8 mm. As shown in FIG. 6, given that the depth of the cavity 28 is 1.5 mm and the depth of the cavities 6a, 6a is 1 mm, the resonance frequency of the resonator 4c will be 780 MHz, lower than the 800 MHz of the other resonators 4a and 4b.

In the above embodiment, the connecting surfaces of the resonators 4a, 4b and 4c have respective coupling grooves 10 and 32. However, the coupling grooves may be formed only in one of a pair of the opposite surfaces to constitute a coupling hole. In this case, the other, opposite surface has a conductive-layer removed portion corresponding to the groove opposite. This coupling hole can also provide electromagnetic coupling. Furthermore, the present invention can be applied to a filter having four or more resonators, although the filter described in the above has three resonators.

Embodiment 4

Figure 7:
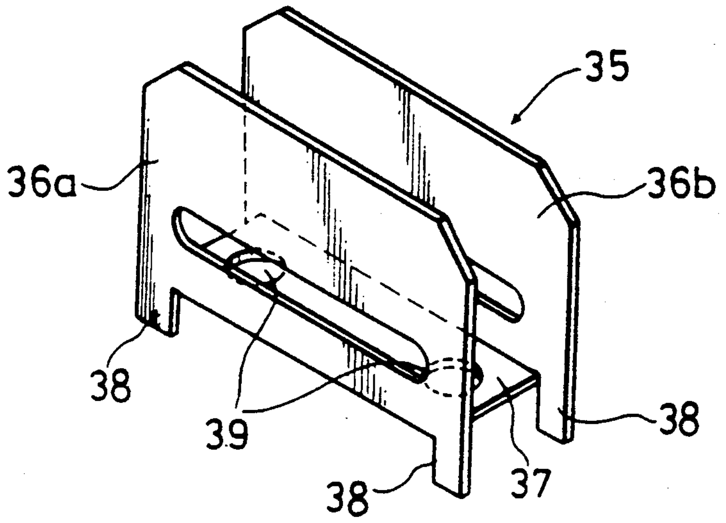
FIG. 7 is an isometric view showing a frame for use in Embodiment 4.

Modified from the dielectric filter 1 of Embodiment 1, a dielectric filter may have a frame 35, as shown in FIG. 7, instead of the frame 3. This frame 35 comprises a pair of walls 36a and 36b, and a supporting part 37 extending laterally between the walls 36a and 36b. Both walls 36a and 36b have legs on the bottom of the side ends in FIG. 7, for earthing and mounting on a circuit board. The supporting pat 37 has a pair of holes 39, 39 for allowing the terminal pins 18 of the capacitors 15 to project.

According to this embodiment, the frame 35 contains the filter body 2 between the pair of walls 36a and 36b, whereby the open-circuiting surface faces onto the supporting part 37. The filter body 2 is fixed to the walls 36a and 36b through solder layers (not shown). Therein, the terminal pins 18, 18 of the filter body 2 project downwardly through the holes 39, 39 in FIG. 7. The coupling hole 11 of the filter body 2 is covered by the walls 36a and 36b.

In the dielectric filter according to the present embodiment, hardly any ambient noise enters the coupling hole 11, and hardly any noise in the coupling hole 11 is emitted, due to the same features as in the dielectric filter 1 according to Embodiment 1.

EMBODIMENT 5

Figure 8:
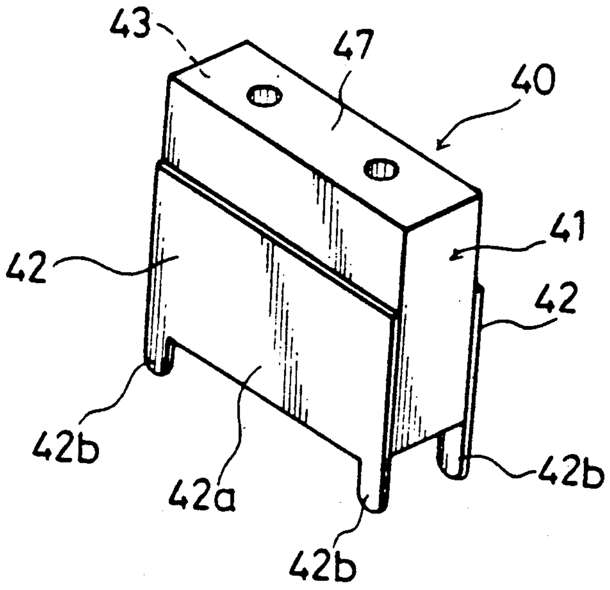
FIG. 8 is an isometric view showing a dielectric filter of Embodiment 5.
Figure 9:
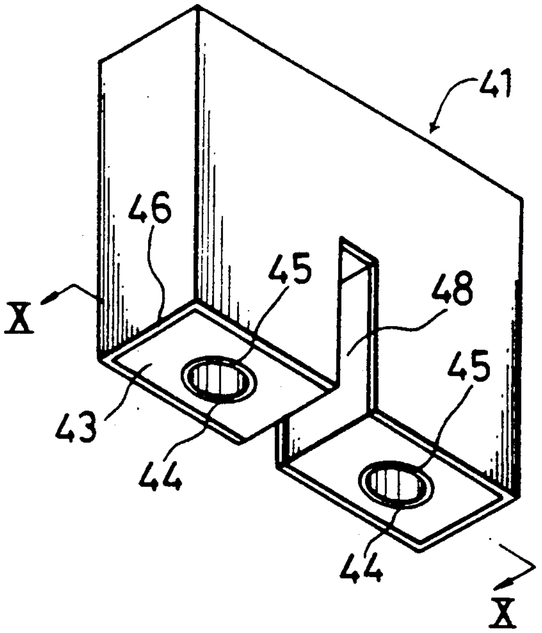
FIG. 9 is an isometric view showing a dielectric filter body of Embodiment 5.
Figure 10:
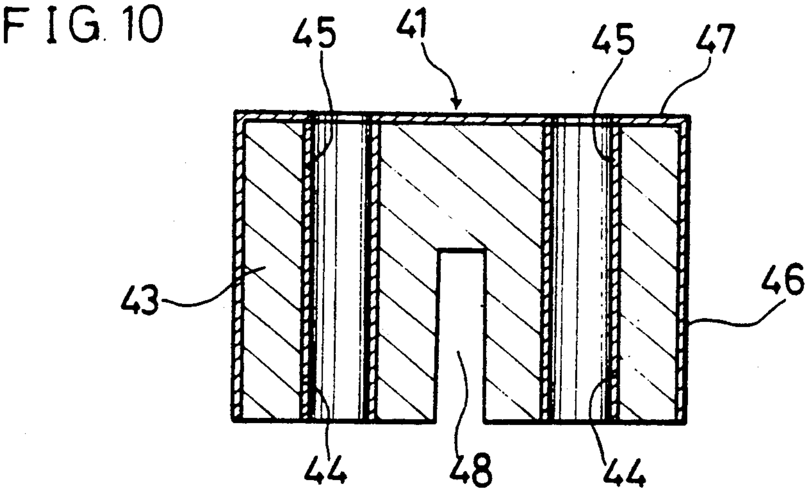
FIG. 10 is a sectional view taken along the line X—X of FIG. 9.

FIG. 8 shows a dielectric filter of Embodiment 5. Referring to the figure, a dielectric filter 40 has a filter body 41, and a pair of metal plates 42, 42 affixed to the filter body 41. FIGS. 9 and 10 show the filter body 41 in detail. The filter body 41 is made of a parallelopiped dielectric block 43 which has a pair of through-holes 44, 44 extending from the upper surface to the bottom surface in the figures. Inner conductive layers 45 coat the inner surfaces of the through holes 44, 44. An outer conductive layer 46 coats the outer surface of the dielectric block 43. A short-circuiting layer 47 coats the top surface of the dielectric block 43, whereby the inner conductive layers 45 and the outer conductive layer 46 are short-circuited. A slit 48 is formed between the pair of through-holes 44, 44, extending from the bottom surface, or the open-circuiting surface, into the central portion of the dielectric block 43, in parallel with the through-holes 44. For convenience of illustration, the thickness of the inner conductive layers 45, the outer conductive layer 46 and the short-circuiting layer 47 is enhanced in the figures.

The filter body 41 constitutes a filter circuit with electromagnetic coupling between the pair of resonators at the slit 48, or the coupling part. The degree of coupling can be controlled by altering the size of configuration of the slit 48. The filter body 41 is given a predetermined passband by means of such an alteration of the slit 48.

Each of the metal plates 42 has a plane part 42a and legs 42b for earthing. The plane part 42a is made in a rectangular of which the longer side is of almost the same length as the width of the filer body 41. The width of shorter side of the plane part 42a is about two thirds of the height of the filter body 41. The legs 42b project beyond the plane part 42a at both ends along the lower side of the plane part 42a.

The metal plates 42 are affixed to a pair of opposite surfaces of the filter body 41. The metal plates 42 are located toward the open-circuiting surface of the filter body 41, whereupon they cover the slit 48.

The dielectric filter 40 according to the present invention is mounted on a predetermined part of a circuit board which has a prescribed wiring pattern in the same manner as in Embodiment 1. Therein, the legs 42b perform to earth the outer conductive layer 46, and to dispose the filter body 41 in a predetermined position. The dielectric filter 40 is soldered onto the circuit board with the legs 42b. Thus, the dielectric filter 40 according to the present embodiment is readily to mounted onto the circuit board.

The slit 48 of the dielectric filter 40 on the circuit board is covered by the pair of metal plates 42 and the circuit board. Therefore, hardly any ambient noise enters the slit 48 of the dielectric filter 40, and hardly any noise in the slit 48 is emitted, in the same manner as in Embodiment 1.

In a manner similar to the assembly of dielectric filters 1 according to Embodiment 1, the dielectric filters 40 according to the present embodiment are assembled by interposing a plurality of filter bodies 41 between one lot of pairs of metal plates 42 which are formed integrally with lead frames, and affixing metal plates 42 onto both sides of the filter bodies 41. Accordingly, the dielectric filter 40 of the present embodiment can be readily mass-produced at low cost.

Embodiment 6

Figure 11:
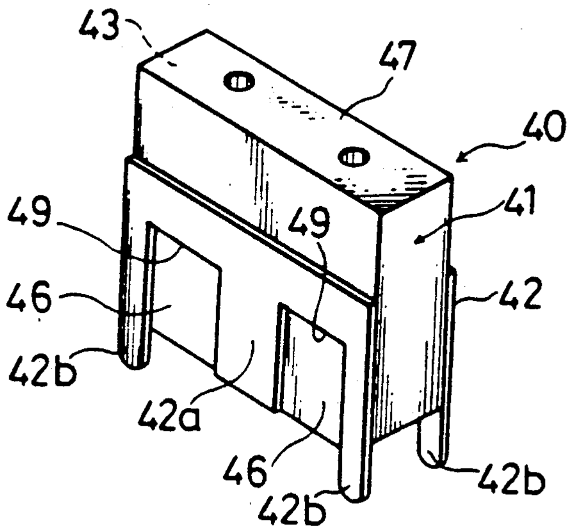
FIG. 11 is an isometric view showing a dielectric filter of Embodiment 6.

Modified from Embodiment 5, as shown in FIG. 11, the plane part 42*a* of the metal plates 42 may have notches 49 provided that the plane part 42*a* covers the slit 48.

In this embodiment, removing part of the outer conductive layer 46 with a laser beam through the notches 49 can be accomplished to control the resonance frequency of the resonators constituting the filter body 41.

Various details of the invention may be changed without departing from its spirit nor its scope. Furthermore, the foregoing description of the embodiments according to the present invention is provided for the purposes of illustration only, and not for the purpose of limiting the invention as defined by the appended claims and their equivalents.

What is claimed is:

1. A dielectric filter comprising:

a first resonator including a first dielectric block having a first through-hole, a first inner conductive layer coating the inner surface of said first through-hole, and a first outer conductive layer coating the outer surface of said first dielectric block; and a second resonator being in contact with said first resonator, including a second dielectric block having a second through-hole, a second inner conductive layer coating the inner surface of said second through-hole, and a second outer conductive layer coating the outer surface of said second dielectric block; wherein each of said resonators has opposed upper and bottom surfaces between which the associated through-hole extends, the pair of resonators have a coupling hole extending transversely to said through-holes through parts at which said resonators face each other, said coupling hole extends into at least one of said dielectric blocks, and said coupling hole is spaced from said upper and bottom surfaces of said resonators.

2. A dielectric filter according to claim 1, wherein said coupling hole is constituted by a couple of coupling grooves formed through the surfaces of the pair of resonators adjacent to each other.

3. A dielectric filter according to claim 2, wherein said coupling grooves are located through the middles of said adjacent surfaces.

4. A dielectric filter according to claim 3 further comprising capacitors; wherein one of said opposed surfaces of each of said dielectric blocks is an open-circuiting surface wherein and en of said through-holes is located; and each of said capacitors is connected with said inner conductive layer at said open-circuiting surface.

5. A dielectric filter according to claim 4, wherein each of said dielectric blocks has a cavity extending from said open-circuiting surface to said through hole; and one of said capacitors is located in said cavity.

6. A dielectric filter according to claim 5 further comprising a frame having a leg for earthing, fixed to said pair of resonators.

7. A dielectric filter according to claim 6, wherein said frame includes a pair of metal plates fixed to a pair of main surfaces of said pair of resonators.

8. A dielectric filter according to claim 7, wherein said coupling hole is covered by said frame.

9. A dielectric filter according to claim 6, wherein said frame further includes a pair of holding parts fixed on said pair of main surfaces of said pair of resonators, and a supporting part integrally formed between said holding parts opposite to an end surface of said pair of resonators.

10. A dielectric filter according to claim 1, wherein said coupling hole is constituted by a plurality of pairs of coupling grooves formed through the middle of the adjacent surfaces of said pair of resonators.

11. A dielectric filter comprising:

a pair of first resonators each of which has a first dielectric block having a first through-hole which has a first cavity at an end, a first inner conductive layer coating the inner surface of said first through-hole, and a first outer conductive layer coating the outer surface of said first dielectric block; and a second resonator located between the pair of first resonators, including a second dielectric block having a second through-hole which has a second cavity at an end, a second inner conductive layer coating the inner surface of said second through-hole, and a second outer conductive layer coating the outer surface of said dielectric block; wherein each of said resonators has opposed upper and bottom surfaces between which the associated through-hole extends, said first and second resonators have coupling holes extending transversely to said through-holes through parts at which said resonators face each other, each said coupling hole extends into at least one of said dielectric blocks, and each said coupling hole is spaced from said upper and bottom surfaces of said resonators.

12. A dielectric filter according to claim 11, wherein said second cavity is deeper than said first cavities.

13. A dielectric filter comprising:

a first resonator including a first dielectric block having a first through-hole, a first inner conductive layer coating the inner surface of said first through-hole, and a first outer conductive layer coating the outer surface of said first dielectric block; and a second resonator being in contact with said first resonator, including a second dielectric block having a second through-hole, a second inner conductive layer coating the inner surface of said through-hole, and a second outer conductive layer coating the outer surface of said second dielectric block; wherein each of said resonators has opposed upper and bottom surfaces between which the associated through-hole extends, said resonators have a coupling portion therebetween made by hollowing at least one of said dielectric blocks, extending transversely to said through-holes, and said coupling portion is spaced from said upper and bottom surfaces of said resonators.

14. A dielectric filter according to claim 13, wherein said coupling portion is constituted by a pair of coupling grooves provided through the surfaces of said dielectric blocks adjacent to each other.

15. A dielectric filter according to claim 14 further comprising a frame fixed to said resonators, having a leg for earthing.

16. A dielectric filter according to claim 15, wherein said frame is constituted by a pair of metal plates fixed to a pair of main surfaces of said resonators.

17. A dielectric filter according to claim 16, wherein said coupling portion is covered by said frame.

18. A dielectric filter according to claim 13, wherein said coupling portion is constituted by a pair of notches formed through the adjacent surfaces of said dielectric blocks.

19. A dielectric filter according to claim 18, wherein one of said opposed surfaces of each of said dielectric blocks is an open-circuiting surface wherein an end of said through-holes is located, and said notches are located near said open-circuiting surface in said adjacent surfaces.

20. A dielectric filter according to claim 18, wherein said dielectric blocks have a short-circuiting surface wherein an end of said through-holes is located for short-circuiting said inner and outer conductive layers, and said notches are formed near said short-circuiting surface in said adjacent surfaces.

21. A dielectric filter according to claim 18, wherein said notches are formed in both ends of said adjacent surfaces.

22. A dielectric filter comprising:

a filter body including a dielectric block having a plurality of through-holes, an inner conductive layer coating the inner surfaces of said through-holes, and an outer conductive layer coating the outer surface of said dielectric block; and a pair of metal plates which are physically independent of, and are spaced apart from, each other, fixed to the outer surfaces of said filter body and having a leg for earthing, said plates being held in position relative to one another only by their connection to said filter body.

23. A dielectric filter according to claim 22, wherein said metal plates are fixed to the pair of main surfaces of said filter body.

24. A dielectric filter according to claim 23, wherein said filter body further includes a coupling portion covered by said metal plates and located between said through-holes.

25. A dielectric filter according to claim 24, wherein said metal plates have a notch to expose part of said outer conductive layer.

26. A method for producing a dielectric filter having a filter body and a frame fixed to the outer surface of said filter body, comprising the steps of:

providing a pair of lead frames incorporating a plurality of metal plates, said lead frames being physically independent of one another;

disposing said filter body between a pair of said metal plates of said pair of lead frames: and fixing said pair of metal plates to said filter body on both sides.

27. A method according to claim 26, wherein said metal plates have a leg for earthing which extend integrally into one of said lead frames.

28. A method according to claim 27 further comprising the step of separating said metal plates from said lead frames after the step of fixing said metal plates.

29. A method according to claim 28 further comprising the step of obtaining said filter body by connecting a first resonator which includes a first dielectric block having a first through-hole, a first inner conductive layer coating the inner surface of said first through-hole, and a first outer conductive layer coating the outer surface of said first dielectric block, with a second resonator which includes a second dielectric block having a second through-hole, a second inner conductive layer coating the inner surface of said second through-hole, and a second outer conductive layer coating the outer surface of said second dielectric block.

30. A method according to claim 29, wherein said first and second resonators include a coupling portion extending transversely to said through-holes through parts at which said resonators face each other.

31. A method according to claim 30, wherein said step of fixing said metal plates further includes covering said coupling portion with said metal plates.

32. A method according to claim 31, wherein said coupling portion is constituted by a pair of coupling grooves formed through the adjacent surfaces of said resonators.

33. A method according to claim 32, wherein said dielectric blocks have an open-circuiting surface wherein an end of said through-holes is located, further comprising the step of disposing capacitors connected with said inner conductive layers on said open-circuiting surface.

34. A method according to claim 33, wherein said dielectric blocks have a cavity extending from said open-circuiting surface to said through-hole; and said step of disposing said capacitors includes disposing said capacitors in said cavities.

* * * * *